(12) United States Patent
Dow et al.

(10) Patent No.: US 7,879,381 B2
(45) Date of Patent: Feb. 1, 2011

(54) COOKING UTENSIL WITH FLAVORING INFUSER

(75) Inventors: Shannon Dow, Berkeley, CA (US); Sharon Ellen Kallenberger, Alameda, CA (US)

(73) Assignee: Charcoal Companion, Inc., Emeryville, CA (US)

( * ) Notice: Subject to any disclaimer, the term of this patent is extended or adjusted under 35 U.S.C. 154(b) by 695 days.

(21) Appl. No.: 10/971,580

(22) Filed: Oct. 21, 2004

(65) Prior Publication Data

US 2006/0057267 A1    Mar. 16, 2006

Related U.S. Application Data

(63) Continuation-in-part of application No. 29/212,967, filed on Sep. 10, 2004, now Pat. No. Des. 506,352.

(60) Provisional application No. 60/614,412, filed on Sep. 28, 2004.

(51) Int. Cl.
    *A47J 37/07* (2006.01)
(52) U.S. Cl. ............... 426/523; 99/345; 99/419; 99/446
(58) Field of Classification Search ........... 426/523; 99/345–347, 400–401, 419, 421 R, 421 V, 99/444, 446–447; D7/361
    See application file for complete search history.

(56) References Cited

U.S. PATENT DOCUMENTS

| | | | |
|---|---|---|---|
| 2,362,921 A | 11/1944 | Palensky | |
| 2,821,904 A | 2/1958 | Arcabosso | |
| 4,380,190 A * | 4/1983 | Adamis | 99/345 |
| 4,887,523 A * | 12/1989 | Murphy et al. | 99/419 |
| 5,301,602 A | 4/1994 | Ryczek | |
| 5,575,198 A | 11/1996 | Lowery | |
| 6,062,131 A | 5/2000 | Holland | |
| 6,119,585 A * | 9/2000 | Guidry | 99/345 |
| 6,125,739 A | 10/2000 | Jernigan | |
| 6,192,792 B1 * | 2/2001 | Gremillion | 99/426 |
| 6,427,582 B1 | 8/2002 | Measom | |
| 6,460,452 B1 * | 10/2002 | Hester | 99/347 |
| 6,467,399 B1 | 10/2002 | Boutte | |
| 6,487,964 B2 | 12/2002 | Snoke et al. | |
| 6,502,501 B1 | 1/2003 | Simon | |
| 6,502,503 B1 | 1/2003 | Bell | |
| 6,503,551 B1 | 1/2003 | Hester | |
| 6,553,896 B1 * | 4/2003 | Heide | 99/347 |
| 6,557,460 B2 * | 5/2003 | Hester | 99/347 |

(Continued)

*Primary Examiner*—Drew E Becker
(74) *Attorney, Agent, or Firm*—Donald L. Beeson

(57) ABSTRACT

A utensil for flavoring fowl while cooking it over a heat source such as a barbecue has a pan-shaped base with a center portion and an upright cup-shaped holder extending upward from the top side of the base's center portion. An upright liquid infuser tube is provided which can be removably placed within the cup-shaped holder. The infuser tube has a bottom end sized to be loosely fit within the cup-shaped holder and sidewalls that extend above the cup-shaped holder when the infuser tube is placed in the holder. The extension of the infuser tube's sidewalls form a top portion of the infuser tube which has at least one infuser opening, and which is insertable into the body cavity of a fowl. The base's cup-holder is sized to receive a standard beverage can, such that the infuser tube can be exchanged with an open beverage can, such as a beer can, if desired.

21 Claims, 6 Drawing Sheets

U.S. PATENT DOCUMENTS

| | | |
|---|---|---|
| 6,622,616 B1 | 9/2003 | Measom |
| D493,256 S | 7/2004 | Kim |
| 6,779,438 B1 | 8/2004 | Citrynell et al. |
| D506,352 S * | 6/2005 | Dow et al. .................. D7/361 |
| 7,063,007 B2 * | 6/2006 | Citrynell et al. ............... 99/347 |
| 7,144,596 B2 * | 12/2006 | Snoke et al. ................ 426/644 |
| 2002/0100371 A1 | 8/2002 | Snoke et al. |
| 2002/0195001 A1 | 12/2002 | Hester |
| 2005/0172823 A1 * | 8/2005 | Riddle, III .................. 99/345 |

* cited by examiner

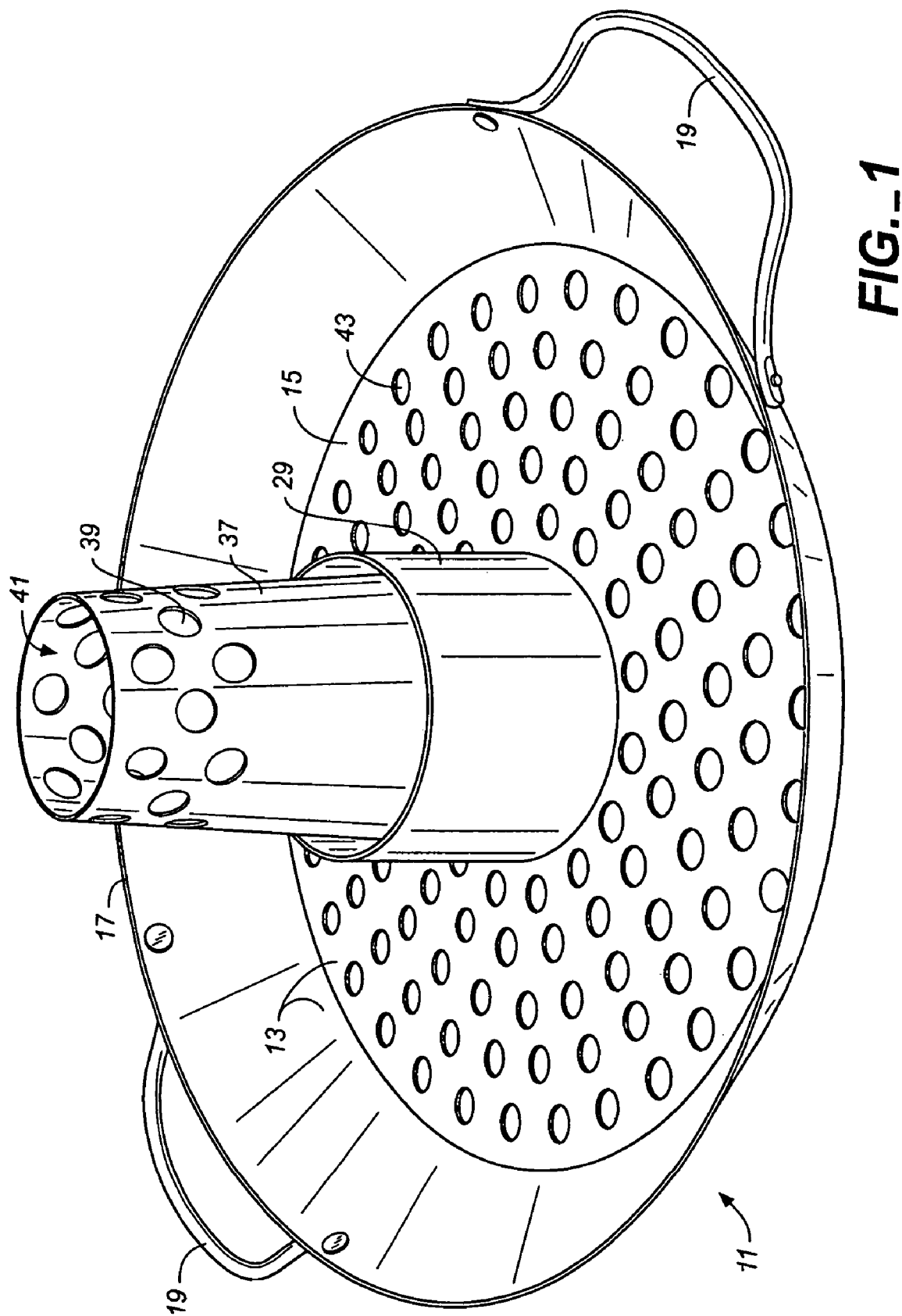
FIG._1

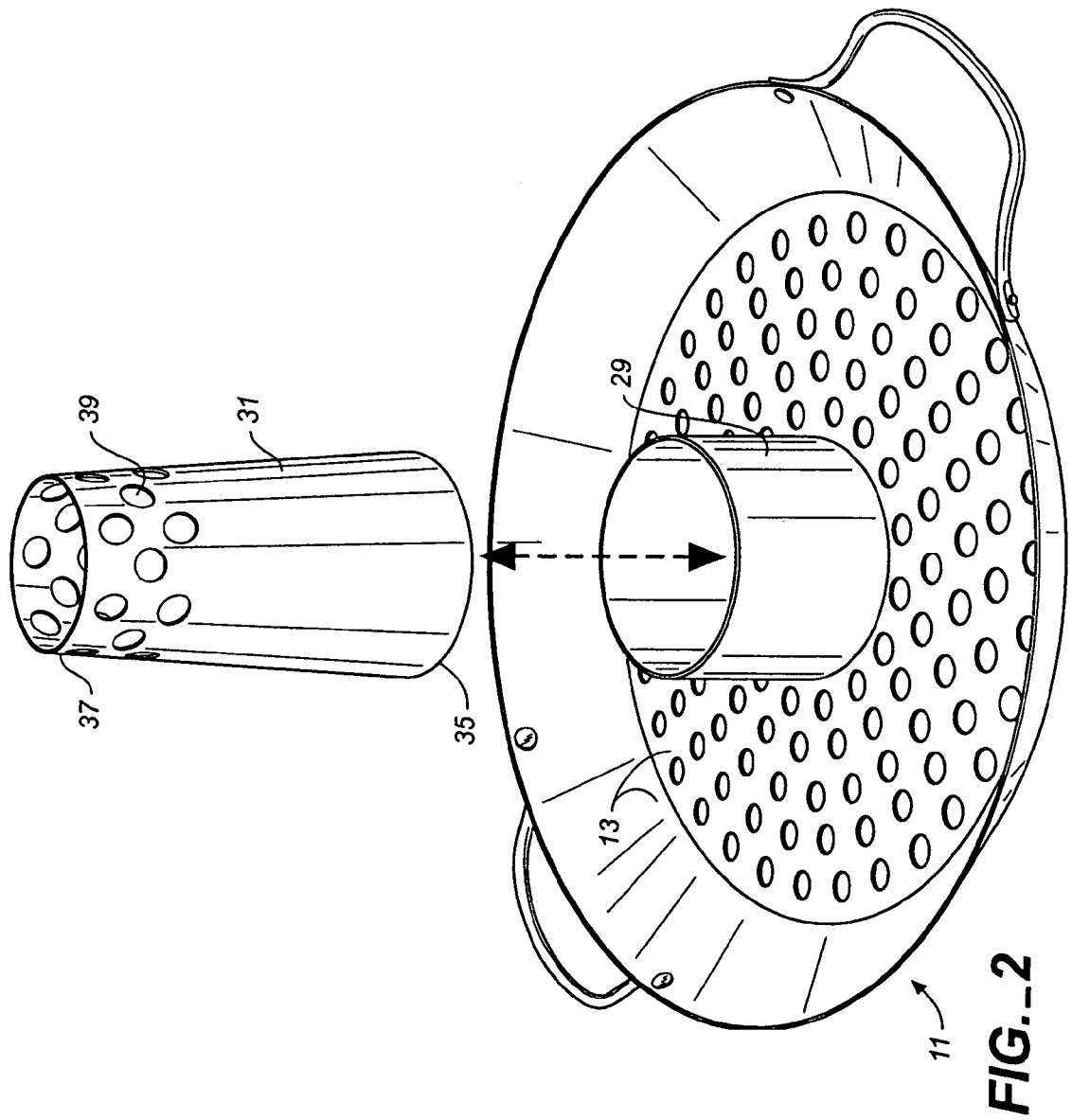
FIG._2

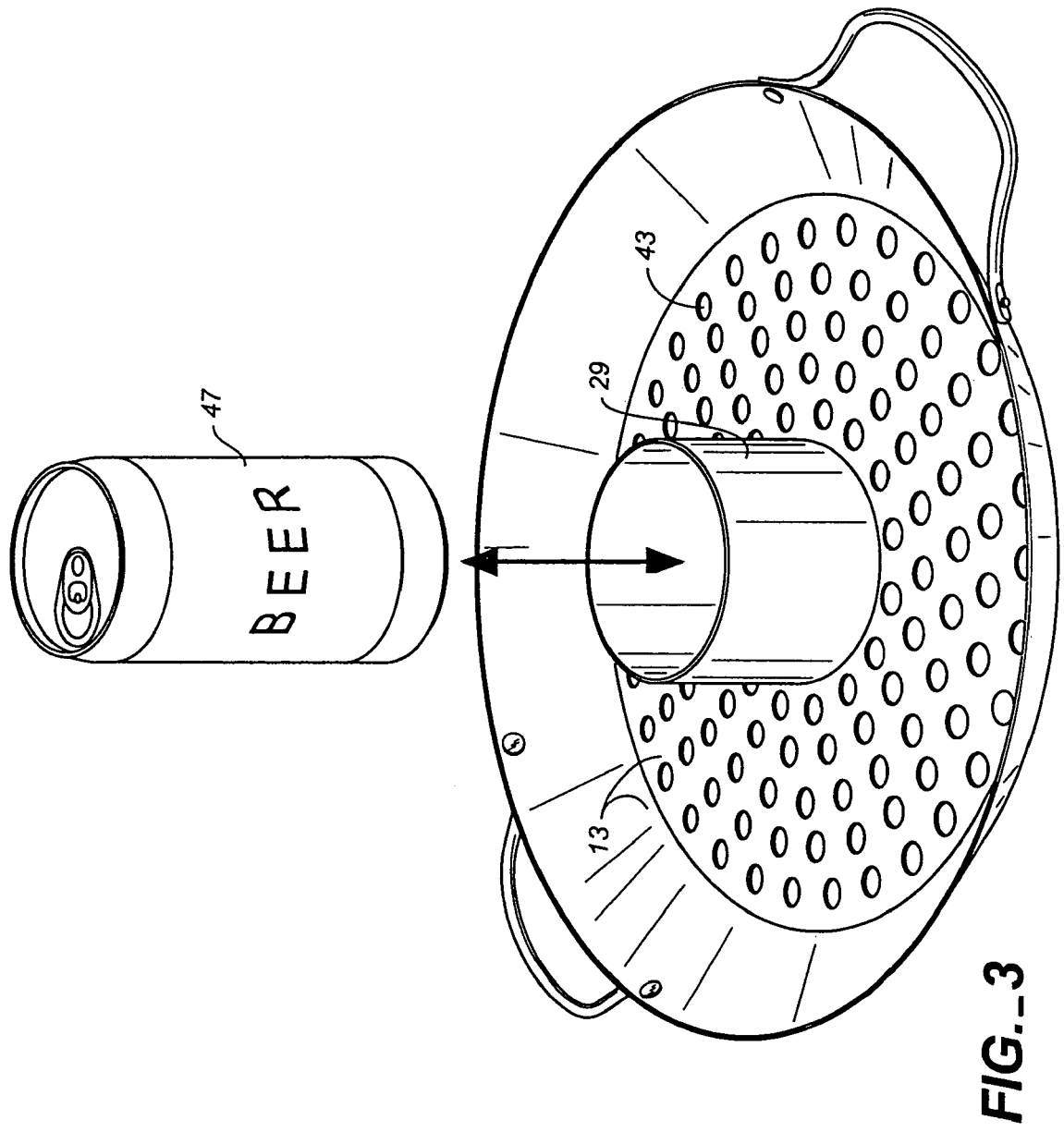
FIG._3

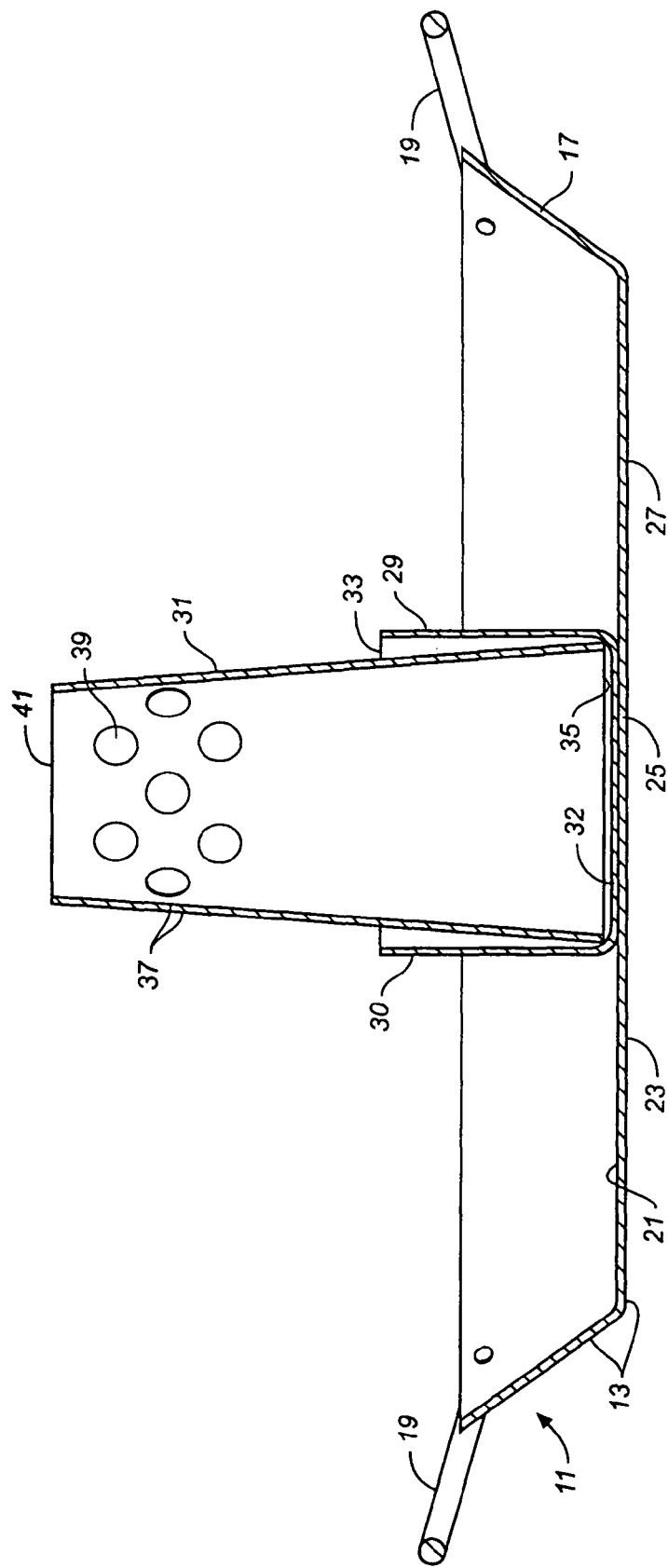
FIG._4

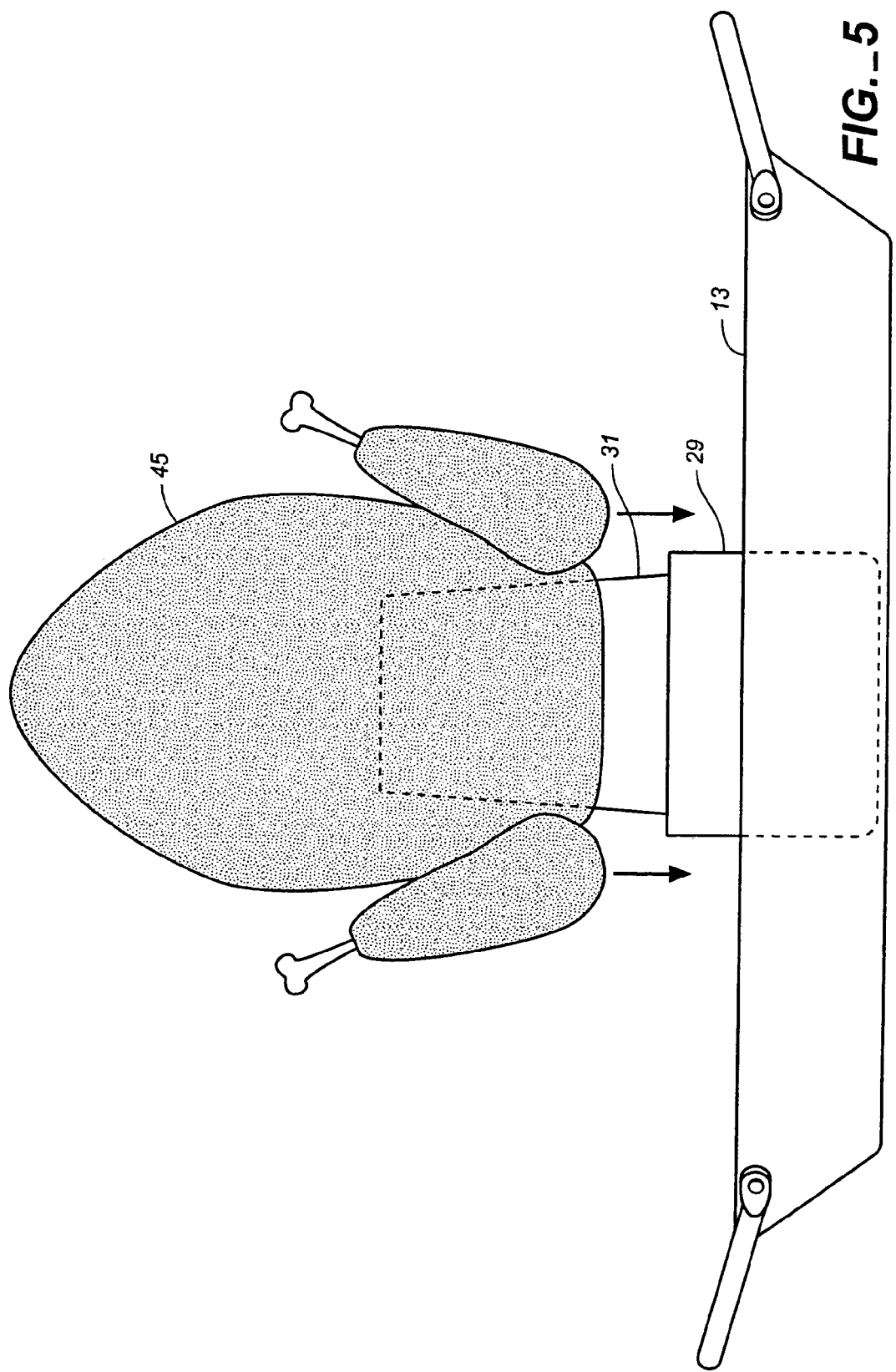
FIG._5

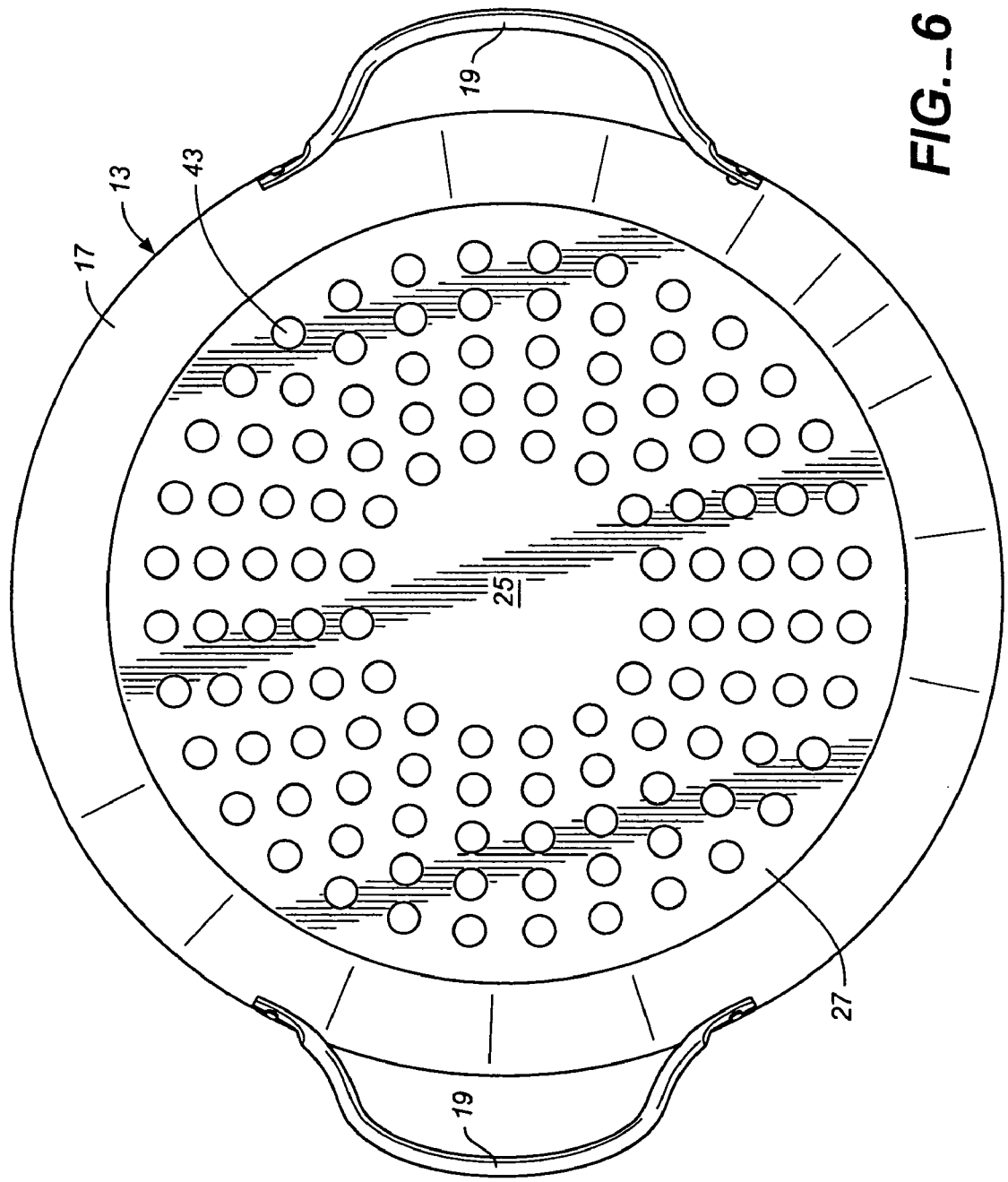
*FIG._6*

COOKING UTENSIL WITH FLAVORING INFUSER

CROSS-REFERENCE TO RELATED APPLICATIONS

This is a continuation-in-part of prior U.S. application Ser. No. 29/212,967, filed Sep. 10, 2004, now U.S. Pat. No. D506,352. This application also claims the benefit of U.S. Provisional Application Ser. No. 60/614,412, filed Sep. 28, 2004.

BACKGROUND OF THE INVENTION

The present invention generally relates to cooking utensils of the type commonly used to barbecue chicken or other fowl, and particularly relates to cooking utensils capable of holding a flavoring liquid which can be vaporized and infused into the fowl as it is being cooked.

A well-known technique for flavoring chicken or other fowl as it is being cooked on the barbecue or other cooking apparatus is to add a flavoring liquid that can be vaporized and conducted up into the body cavity of the fowl during the cooking process. One common technique is to place the back end of the fowl down onto an open beer can set onto a cooking plate or pan such that, when the beer in the can is vaporized by the heat of the cooking apparatus, it infuses the meat surrounding the body cavity of the fowl with a characteristic flavor imparted by the beer. Other techniques for infusing a steam or vapor into the body cavity of the fowl involve special infusing devices or stands which provide a liquid holding container for the flavoring liquid and an infuser tube onto which the fowl is placed. One such device is disclosed in U.S. Pat. No. 6,779,438, which illustrates a steamer-smoker grilling device for fowl comprised of a pyramid shaded grilling base, a liquid holding cup insertable in the base, and a straight-sided cylindrical infuser tube that screws onto the top of the base. When the base of the grilling device is heated, flavoring liquid placed in the cup inside the base is vaporized and conducted through the attached infuser tube into the body cavity of a fowl placed over the tube.

U.S. Pat. No. 6,062,131 issued to Robert Holland discloses yet another example of a heretofore known apparatus for infusing a flavoring vapor into the body cavity of a chicken or the like while it is being cooked. In the Holland patent, a cylindrical infuser tube is provided that fits into a top opening of a roasting stand having downwardly sloped walls. A bottom cap is welded onto the bottom of the infuser tube to permanently enclose the bottom end of the tube so that it can hold an infuser liquid.

The need exists for improved cooking utensils for cooking fowl and for providing a flavoring vapor to the body cavity of the fowl. There is a particular need for a cooking utensil that has a simple construction, that is easy to use, that is versatile, that can be used to cook other foods such as vegetables and/or herbs along with the fowl, and that can readily be packaged in flat, stackable consumer packaging.

SUMMARY OF THE INVENTION

Briefly, the invention involves a cooking utensil for cooking and flavoring fowl comprised of a pan base having a substantially flat bottom with a top side, a bottom side, and a center portion. The center portion of the base is provided with a cup-shaped holder for receiving an upright vapor infuser tube which can be removably placed in the holder without fasteners or screwing the infuser tube to the base. The infuser tube has a bottom end sized to be loosely placed down into the cup-shaped holder and sidewalls that extend above the cup-shaped holder when the infuser tube is placed in the holder. The upward extension of the infuser sidewalls forms a top portion of the infuser tube, and this top portion has at least one infuser opening through which a flavoring vapor, produced by heating an infuser liquid at the bottom of the tube, can escape. The top portion of the infuser tube is insertable into any food article placed on the base of the cooking utensil, such as a chicken or other fowl.

Preferably, the base of the cooking utensil is pan-shaped with an upturned rim to best hold and retain vegetables, herbs, or other foods around the base of the fowl supported on the infuser tube. In its preferred form, the infuser tube is a truncated cone with the bottom end having a diameter that closely fits into a cylindrically-shaped holder on the utensil's pan base. Such a shape will provide a taper that facilitates insertion of the tube into the fowl. Multiple perforations are suitably provided in the top portion of the infuser tube to increase the openings through which the flavoring vapor can be infused into the fowl.

In one aspect of the invention, the cup-shaped holder for the infuser tube is sized and shaped to hold a standard size beverage can such as a beer can. Thus, a comparably sized infuser tube supplied as part of the cooking utensil can readily be replaced with an open beverage can to provide an alternative source for the flavoring liquid.

In another aspect of the invention, a method is provided for cooking and flavoring fowl using a utensil which can be employed to selectively and interchangeably use an infuser tube or open beverage container as the vehicle for infusing a flavoring vapor into the body cavity of the fowl as it is being cooked.

Thus, it can be seen that a primary object of the invention is to provide an improved cooking utensil that can be used on a barbecue, stove top or other cooking apparatus for cooking fowl while at the same time infusing the fowl with a flavoring liquid. It is a further object of the invention to provide such a cooking utensil with a flavoring infuser tube that can easily be used without mechanical connections and that is interchangeable with a beverage container as an alternative source of a flavoring liquid. It is another object of the invention to provide a cooking utensil that supports a fowl in a vertical position over a flavoring infuser tube while at the same time holding vegetables, herbs or the like in close proximity to the fowl being cooked. The foregoing are not exclusive objects of the invention. Other objects will be apparent from the following specification and the accompanying drawings.

DESCRIPTION OF THE DRAWINGS

FIG. 1 is a top perspective view of a cooking utensil in accordance with the invention showing an infuser tube placed into a cup-shaped holder in the middle of the base of the utensil.

FIG. 2 is a top perspective view of the cooking utensil shown in FIG. 1, with the infuser tube removed.

FIG. 3 is a top perspective view of the cooking utensil shown in FIG. 1, with a standard size beer can exchanged for the infuser tube.

FIG. 4 is a cross-sectional view of the cooking utensil shown in FIG. 1.

FIG. 5 is a side elevational view of the cooking utensil shown in FIG. 1 illustrating the placement of a chicken onto the infuser tube.

FIG. 6 is a bottom plan view of the pan base of the cooking utensil shown in FIG. 1.

DETAILED DESCRIPTION OF THE ILLUSTRATED EMBODIMENT

Referring now to the drawings, a cooking utensil 11 in accordance with the invention includes a generally pan-shaped metal base 13 having a flat bottom 15, an upturned rim 17, and a pair of opposed gripping handles 19. As best represented in FIG. 4, the flat bottom of the pan base has a top side 21, a bottom side 23, a center portion 25, and a perimeter portion 27. An upright cup-shaped holder 29 extends upwardly from the top side of the pan base's center portion 25 for holding an infuser tube 31 provided as part of the cooking utensil. The infuser tube, which is sized and shaped to be loosely placed within the center holder 29 so that it can be easily inserted and-removed, has a bottom end 35 that sets down into the base's holder and a top portion that extends substantially above the top of the holder. The preferred shape of the infuser tube is a truncated cone, wherein the tapered sidewalls of the cone facilitate placement of the fowl onto the infuser tube as hereinafter described. The shape of the center holder is preferably a cylindrical shape, with the diameter of the bottom end of the infuser tube roughly corresponding to the inside diameter of the holder.

It is understood that the center holder and/or the infuser tube could be of other shapes, such as a polygonal cross-sectional shape, and that it is not intended that the invention be limited to the particular shapes of the holder and infuser tube illustrated in the drawings. It will also be appreciated that the cup-shaped holder and infuser tube are, like the utensil's base, preferably metal parts. Both can suitably be fabricated from punched or cut pieces of sheet metal formed into the desired shape. In the case of the infuser tube, the edges of a punched and bent piece of sheet metal can be joined by spot welds or the like.

As best illustrated in FIG. 4, it can be seen that a center cup-shaped holder 29 is suitably fabricated as a separate cup-shaped element having upright cylindrical sidewalls 30 and a bottom wall 32. The holder can be fastened to the center portion 25 of the flat bottom of the utensil's pan base 13 by any suitable means, for example, by spot welding the cup to a base. It would also be possible for the center holder to be formed by a cylindrical ring affixed, for example by welding, to the bottom of the pan base, such that the center portion of the bottom of the base forms the bottom of the cup holder. It would still further be possible for the cup-shaped holder to be provided as a separate part which is not permanently affixed to the base of the utensil, but which is set into a location fixing structure provided on the center portion of the pan base, such as a detent on or shoulders affixed to the base. However, such an embodiment would have the disadvantage that the fowl placed over the infuser tube in the cup holder would have a tendency to shift during the cooking process.

It is seen that multiple round perforations 39 are provided about the circumference of the infuser tube wall at the tube's top end portion 37. The infuser tube also has a top opening 41, which together with the round perforations provides a means for vapor produced from a flavoring liquid in the cup-shaped holder to escape into the body of a chicken or the like placed over the infuser tube. Round perforations 43 are also optionally provided in the perimeter area 27 of the base's flat bottom 23 to permit juices to escape from the pan-shaped base during the cooking process. It will be understood that the top of the infuser tube could be closed or partially closed, or that the perforations could be eliminated in favor of one or more openings at the top of the infuser tube. However, the combination of an open top and perforations illustrated in the drawings provides an easily manufacturable infuser tube that will distribute a flavoring vapor throughout the body cavity of the fowl.

To use the cooking utensil of the invention, the center cup-shaped holder 29 of the utensil's pan base 13 is filled with a flavoring liquid such as beer, wine, or a favorite basting recipe. The infuser tube 31 is then placed in the holder with its open bottom end 35 down. As illustrated in FIG. 5, the back end of a fowl, such as the illustrated chicken 45, is then forced down over the top of the infuser tube such that the fowl is supported in a vertical position on the tube and such that the top end portion 37 of the tube with its wall perforations 39 reside well within the body cavity of the fowl. Vegetables and/or herbs can be added to the perforated perimeter portion 27 of the bottom of the pan-shaped base to cook beside the fowl. As the infuser liquid in the infuser tube heats up, the fowl will be basted from the inside out, while the vegetables and/or herbs absorb the juices from the fowl as it cooks.

FIG. 3 illustrates an alternative to using the infuser tube 31 of the invention, wherein a standard open beer can 47 containing a quantity of beer is substituted for the infuser tube. By removing the infuser tube and placing the open beer can into the center holder 29, the traditional way of infusing a flavoring steam to the inside of the poultry cavity can be replicated. The easily removable infuser tube has a further advantage in that the infuser tube can be easily packaged with the relatively flat utensil base 13 in flat stackable consumer packaging by laying the separate infuser tube on its side.

Therefore, it can be seen that the present invention provides an improved utensil for cooking chicken or other fowl, while infusing the body cavity of the chicken with a desired flavoring. While the invention has been described in considerable detail in the foregoing specification and the accompanying drawings, it is understood that it is not intended that the invention be limited to such detail, except as necessitated by the following claims.

What we claim is:

1. A cooking utensil for cooking and flavoring fowl comprising
    a pan-shaped base having an upturned rim and a substantially flat bottom with a top side, a bottom side, and a center portion,
    an upright cup-shaped holder for holding a flavoring liquid, said upright cup-shaped holder extending upward from the top side of the flat bottom of said pan-shaped base at the center portion thereof, said cup-shaped holder having a bottom and upright sidewalls and being sized and shaped to receive and hold a beverage can, and
    an upright liquid infuser tube having a bottom end sized and formed for removable placement down into said cup-shaped holder without mechanical connections, and wherein the bottom end of the infuser tube rests loosely inside the cup-shaped holder at the bottom of the cup-shaped holder for ease of placement and removal, said infuser tube further including sidewalls that extend upward from the bottom end of the infuser tube so as to project above said cup-shaped holder when the infuser tube is placed in the cup-shaped holder, the extension of said sidewalls forming a top portion of said infuser tube having at least one infuser opening, said top portion being insertable into the body cavity of a fowl when placed on the infuser tube.

2. The cooking utensil of claim 1 wherein the sidewalls of said infuser tube taper from a larger bottom end down to a smaller top portion that projects above said cup holder.

3. The cooking utensil of claim 1 wherein the at least one infuser opening in the top portion of said infuser tube includes perforations in the sidewalls of the infuser tube at the top end portion thereof.

4. The cooking utensil of claim 1 wherein said cup-shaped holder has a substantially cylindrical shape and wherein the infuser tube is in the shape of a truncated cone having a larger diameter bottom end which loosely fits within said cup-shaped holder.

5. The cooking utensil of claim 4 wherein the at least one infuser opening in the top portion of said infuser tube includes perforations in the sidewalls of the infuser tube at the top end portion thereof.

6. The cooking utensil of claim 1 wherein the bottom of said base is perforated in areas of the bottom outside the center portion thereof.

7. The cooking utensil of claim 1 wherein the bottom end of said infuser tube is open and wherein the upright cup-shaped holder is capable of holding an infuser liquid, such that the infuser tube is partially filled with infuser liquid in the holder when the infuser tube is placed in the holder.

8. The cooking utensil of claim 1 wherein the top portion of said infuser tube terminates at an open top end of the infuser tube.

9. The cooking utensil of claim 1 wherein the cup-shaped holder is fabricated of a separate part fastened to the top side of the center portion of the bottom of said base.

10. The cooking utensil of claim 1 wherein said cup-shaped holder is sized and shaped to accommodate a standard sized beverage can, wherein the removable liquid infuser tube can readily be exchanged for an opened beverage can such that the beverage in the beverage can provides the infuser liquid for the fowl placed on the infuser tube.

11. A cooking utensil for cooking and flavoring fowl comprising
a pan-shaped base having an upturned rim and a substantially flat bottom with a top side, a bottom side, and a center portion,
an upright cup-shaped holder for holding an infuser liquid, said holder extending upward from the top side of the flat bottom of said base at the center portion thereof and having a bottom and substantially cylindrical upright sidewalls and capable of being filled with and containing an infuser liquid, and
an upright liquid infuser tube having an open relatively large diameter bottom end sized for placement down into said cup-shaped holder within the cylindrical sidewalls thereof, and wherein the bottom end of the infuser tube rests loosely inside the cup-shaped holder at the bottom of the cup-shaped holder without mechanical connections, such that the infuser tube can be easily placed into and removed from the cup-shaped holder, said infuser tube having sidewalls that taper inwardly from its bottom end to form a truncated cone having a smaller diameter open top portion that projects above said cup-shaped holder, the top portion of said infuser tube having infuser openings therein and being insertable into the body cavity of a fowl placed on the infuser tube.

12. The cooking utensil of claim 11 wherein the bottom of said pan-shaped base is perforated in areas of the bottom outside the center portion thereof.

13. The cooking utensil of claim 11 wherein the top portion of said infuser tube terminates at an open top end of the infuser tube.

14. The cooking utensil of claim 11 wherein the cup-shaped holder is fabricated of a separate part fastened to the top side of the center portion of the bottom of said base.

15. The cooking utensil of claim 11 wherein said cup-shaped holder is sized to accommodate a standard sized cylindrical beverage can, wherein the removable liquid infuser tube can readily be exchanged for an opened beverage can such that the beverage in the beverage can provides the infuser liquid for the fowl placed on infuser tube.

16. A cooking utensil for cooking and flavoring fowl comprising
a pan-shaped base having an upturned rim and a flat bottom with a top side, a bottom side, and a center portion,
an upright cylindrical holder for holding an infuser liquid, said holder having a bottom and upright sidewalls, said holder extending upward from the top side of the center portion of said base above the upturned rim of said pan-shaped base, and
an upright liquid infuser tube on which a fowl can be supported by inserting the infuser tube into the body cavity of the fowl, said infuser tube having an open bottom end sized for placement down into said cylindrical holder without mechanical connection, and wherein the open bottom end of the infuser tube rests loosely inside the cylindrical holder at the bottom of the holder such that the infuser tube can easily be placed in and removed from the cup-shaped holder,
said cylindrical holder being sized and shaped to accommodate a standard sized beverage can when not filled with an infuser liquid, wherein the removable liquid infuser tube can readily be lifted out of and exchanged for an opened beverage can, such that the beverage in the beverage can provides the infuser liquid for flavoring the fowl placed on the beverage can.

17. The cooking utensil of claim 16 wherein the cylindrical holder is sized and shaped to accommodate a standard sized beer can.

18. The cooking utensil of claim 17 wherein the bottom of said pan-shaped base is perforated in areas of the bottom outside the center portion thereof.

19. A method of cooking and flavoring fowl comprising
providing a cooking utensil having a pan-shaped base having an upturned rim, a flat bottom and an upright cup-shaped holder extending upward from the flat bottom of said base, said cup-shaped holder having a bottom and upright sidewalls and capable of being filled with and containing a flavoring liquid, and further having an upright liquid infuser tube which can be removably placed within said holder, said infuser tube having an open bottom end sized and formed for placement down into said cup-shaped holder without any mechanical connection therewith, and wherein the bottom end of the infuser tube rests loosely inside the cup-shaped holder at the bottom of the cup-shaped holder such that the infuser tube can easily be placed into and removed from the cup-shaped holder, said infuser tube further having sidewalls that extend above said cup-shaped holder when the infuser tube is placed therein, the extension of said sidewalls forming a top portion of said infuser tube having at least one infuser opening, said top portion being insertable into the body cavity of a fowl when placed on the infuser tube, said upright cup holder being sized and shaped to receive a standard sized beverage can,
selecting between said infuser tube and a beverage can with a flavoring beverage as a vehicle for infusing a flavoring liquid into the body cavity of a fowl to be cooked, if the infuser tube is selected, filling the cup-shaped holder on the base of said utensil with a flavoring liquid and setting the infuser tube bottom end down into said holder so that the infuser tube rests loosely in the cup-shaped holder at the bottom thereof, if the beverage can is selected, opening the beverage can and placing it bottom end down into said cup-shaped holder so that the beverage can rests loosely in the cup-shaped holder at the bottom thereof, placing the bottom end of the fowl down onto the top of the infuser tube or beverage can, depending on which one is selected, such that the infuser tube or open beverage can inserts into the bottom end of the fowl, and while the fowl is resting on the infuser tube or open beverage can, depending on which one is selected, and with the infuser tube or beverage can resting in the cup-shaped holder on the base of the utensil, providing a source of heat to the bottom of the utensil so as to vaporize the flavoring liquid in the holder or the flavoring beverage in the beverage can, depending on which is selected, and so as to infuse the body cavity of the fowl with flavoring as it is cooked.

20. The method of claim 19 wherein other food items are placed on said base around the cup-shaped holder for absorbing juices from the fowl as it is being cooked.

21. The method of claim 20 wherein perforations are provided in the base of said utensil outside of said cup-shaped holder to allow juices to escape from said utensil.

* * * * *